US011999129B2

(12) United States Patent
Cooper

(10) Patent No.: US 11,999,129 B2
(45) Date of Patent: Jun. 4, 2024

(54) DUNNAGE PRODUCTION SYSTEM

(71) Applicant: Clayton Cooper, Clifton Park, NY (US)

(72) Inventor: Clayton Cooper, Clifton Park, NY (US)

( * ) Notice: Subject to any disclaimer, the term of this patent is extended or adjusted under 35 U.S.C. 154(b) by 0 days.

(21) Appl. No.: 17/957,268

(22) Filed: Sep. 30, 2022

(65) Prior Publication Data

US 2023/0109659 A1 Apr. 6, 2023

Related U.S. Application Data

(60) Provisional application No. 63/251,257, filed on Oct. 1, 2021.

(51) Int. Cl.
*B31D 5/00* (2017.01)

(52) U.S. Cl.
CPC .... *B31D 5/0065* (2013.01); *B31D 2205/0023* (2013.01); *B31D 2205/0041* (2013.01); *B31D 2205/0047* (2013.01); *B31D 2205/0058* (2013.01); *B31D 2205/0082* (2013.01); *B31D 2205/0088* (2013.01)

(58) Field of Classification Search
CPC .......... B31D 5/0065; B31D 2205/0023; B31D 2205/0041; B31D 2205/0047; B31D 2205/0058; B31D 2205/0082; B31D 2205/0088
USPC ........ 493/370, 407, 350, 352, 354, 904, 967
See application file for complete search history.

(56) References Cited

U.S. PATENT DOCUMENTS 2,871,568 A 2/1959 Bien
3,276,096 A 10/1966 Mcaleer et al.
(Continued)

FOREIGN PATENT DOCUMENTS

CA 2481123 A1 10/2003
EP 1155964 A1 11/2001
(Continued)

OTHER PUBLICATIONS

International Search Report from corresponding PCT application PCT/US22/45452 mailed on Jan. 24, 2023 2021, 4 pages.
(Continued)

*Primary Examiner* — Sameh Tawfik
(74) *Attorney, Agent, or Firm* — Tech Valley Patent, LLC; John Pietrangelo

(57) ABSTRACT

A dunnage producing system is disclosed. The system comprises a material feed section configured to feed a sheet stock material into the system to convert it into a dunnage product. The system further comprises a drive belt having a plurality of lugs fixed on the drive belt configured to engage one or more die-cut openings in the sheet stock or roll stock material. The system further comprises one or more folding mandrels and a glue feed section. The folding mandrels capture the engaged sheet stock or roll stock material between the drive belt and folding mandrels. The glue feed section comprises a tank loaded with pre-melted adhesive material, a hose to transfer the pre-melted adhesive material, and a dispensing nozzle to pump the melted adhesive material to the sheet stock material. A controller then receives measurement information and controls the functions of the system to produce dunnage product.

19 Claims, 5 Drawing Sheets

(56) References Cited

U.S. PATENT DOCUMENTS

| | | | |
|---|---|---|---|
| 3,386,348 A * | 6/1968 | Soennichsen ........... B65B 23/04 493/122 |
| 3,416,396 A | 12/1968 | Donner |
| 3,431,613 A * | 3/1969 | Acker, Jr. .............. B21D 31/04 29/6.2 |
| 3,650,877 A | 3/1972 | Johnson |
| 3,811,822 A | 5/1974 | Cherenson |
| 3,839,974 A | 10/1974 | Freres |
| 4,109,040 A | 8/1978 | Ottaviano |
| 4,164,171 A * | 8/1979 | Meyers ................... B31B 50/00 198/408 |
| 4,167,235 A | 9/1979 | Green |
| 4,429,602 A | 2/1984 | Vits |
| 4,566,831 A | 1/1986 | Groth |
| 4,581,876 A * | 4/1986 | Williams .................. B65B 7/26 53/76 |
| 4,640,080 A | 2/1987 | Wright |
| 4,644,733 A | 2/1987 | Dolinar |
| 4,754,541 A * | 7/1988 | Dorner ................... B21D 51/52 198/444 |
| 4,778,439 A * | 10/1988 | Alexander ............ B29C 51/082 493/902 |
| 4,970,845 A * | 11/1990 | Ausnit .................... B65B 43/42 206/820 |
| 4,997,091 A | 3/1991 | McCrea |
| 5,134,013 A | 7/1992 | Parker |
| 5,181,614 A | 1/1993 | Watts |
| 5,213,867 A | 5/1993 | Huston et al. |
| 5,236,507 A | 8/1993 | Brown |
| 5,312,665 A | 5/1994 | Pratt et al. |
| 5,328,568 A | 7/1994 | Pregont |
| 5,383,837 A | 1/1995 | Watts |
| 5,439,730 A | 8/1995 | Kelly et al. |
| 5,468,525 A | 11/1995 | Watts |
| 5,468,556 A * | 11/1995 | Fuss ...................... B29C 69/001 428/218 |
| 5,473,868 A * | 12/1995 | Antonio ................ B65B 43/345 53/381.1 |
| 5,568,867 A | 10/1996 | Lencoski |
| 5,569,519 A | 10/1996 | Ervay et al. |
| 5,571,067 A * | 11/1996 | Ratzel ..................... B65B 55/20 83/369 |
| 5,593,376 A | 1/1997 | Armington et al. |
| 5,643,647 A | 7/1997 | Wischusen, II |
| 5,647,910 A | 7/1997 | Brown |
| 5,738,175 A * | 4/1998 | Alhamad ............. B31D 5/0065 220/88.1 |
| 5,782,735 A * | 7/1998 | Goodrich ............. B31D 1/0031 83/175 |
| 5,946,994 A | 9/1999 | Tether et al. |
| 6,035,613 A * | 3/2000 | Lencoski ............. B65D 81/051 53/139.5 |
| 6,174,273 B1 | 1/2001 | Harding |
| 6,561,964 B1 | 5/2003 | Armington et al. |
| 6,632,165 B1 | 10/2003 | Letourneau et al. |
| 6,805,659 B2 * | 10/2004 | Bohrer .................. B29C 66/135 493/115 |
| 6,910,997 B1 | 6/2005 | Yampolsky et al. |
| 6,948,296 B1 | 9/2005 | Lerner |
| 7,341,000 B2 * | 3/2008 | Williams ........... G03G 15/6529 100/189 |
| 7,788,884 B2 | 9/2010 | Cheich et al. |
| 7,803,100 B2 * | 9/2010 | Lu .......................... B65D 81/09 493/344 |
| 7,849,664 B2 | 12/2010 | Corbett et al. |
| 7,866,125 B2 | 1/2011 | Simmons et al. |
| 8,177,701 B2 | 5/2012 | Kueng et al. |
| 8,272,195 B2 | 9/2012 | Harding et al. |
| 8,303,475 B2 | 11/2012 | Wetsch et al. |
| 8,317,123 B1 | 11/2012 | Erdie |
| 8,348,818 B2 * | 1/2013 | Mierzejewski .......... B65H 5/24 493/30 |
| 8,671,654 B2 * | 3/2014 | Langen ................. B31B 50/022 493/122 |
| 9,371,147 B2 | 6/2016 | Straver |
| 9,694,555 B2 | 7/2017 | Wetsch et al. |
| 10,226,907 B2 * | 3/2019 | Goodrich ............. B31D 5/0013 |
| 10,300,672 B2 | 5/2019 | Wetsch et al. |
| 10,625,484 B2 | 4/2020 | Chan et al. |
| 10,828,859 B2 | 11/2020 | Ciasullo et al. |
| 10,864,696 B2 | 12/2020 | Lammers et al. |
| 10,926,506 B2 | 2/2021 | Wetsch et al. |
| 10,940,659 B2 | 3/2021 | Wetsch et al. |
| 11,007,746 B2 | 5/2021 | Wetsch et al. |
| 11,034,121 B2 | 6/2021 | Wetsch et al. |
| 11,198,268 B2 * | 12/2021 | Desertot ............... B31B 50/282 |
| 11,235,548 B2 | 2/2022 | Wetsch et al. |
| 11,364,701 B2 | 6/2022 | Wetsch et al. |
| 2003/0040416 A1 | 2/2003 | Lucassen et al. |
| 2003/0073558 A1 | 4/2003 | Chesterson et al. |
| 2003/0200111 A1 | 10/2003 | Damji |
| 2007/0117703 A1 | 5/2007 | Cavaliere et al. |
| 2011/0053744 A1 | 3/2011 | Wetsch et al. |
| 2011/0308366 A1 | 12/2011 | Redd |
| 2014/0117071 A1 | 5/2014 | Kannankeril et al. |
| 2015/0144268 A1 * | 5/2015 | Corbin .............. B29C 66/91651 156/359 |
| 2016/0060024 A1 | 3/2016 | Ganzer et al. |
| 2017/0066215 A1 | 3/2017 | Cheich et al. |
| 2017/0100906 A1 | 4/2017 | Beaver et al. |
| 2018/0326691 A1 | 11/2018 | Wetsch et al. |
| 2020/0020253 A1 | 1/2020 | Lin |
| 2020/0139660 A1 | 3/2020 | Corbin et al. |
| 2020/0198914 A1 | 6/2020 | Peterlni |
| 2021/0009797 A1 | 1/2021 | Schabel et al. |
| 2021/0040286 A1 | 2/2021 | Li et al. |
| 2021/0139171 A1 | 5/2021 | Hagestedt et al. |

FOREIGN PATENT DOCUMENTS

| | | | |
|---|---|---|---|
| EP | 2407389 A1 | 1/2012 |
| GB | 2549257 B | 10/2017 |
| GB | 2588153 A | 4/2021 |
| KR | 102257420 B1 | 6/2021 |
| WO | 2015150719 A1 | 10/2015 |
| WO | 2018177653 A1 | 10/2018 |

OTHER PUBLICATIONS

Written Opinion from corresponding PCT application PCT/US22/45452, mailed on Jan. 24, 2023, 8 pages.

Office Action for related pending U.S. Appl. No. 18/104,787 issued on May 17, 2023, 28 pages.

Office Action for related pending U.S. Appl. No. 18/104,787 issued on Oct. 2, 2023, 18 pages.

* cited by examiner

DUNNAGE PRODUCTION SYSTEM

CROSS-REFERENCE TO RELATED APPLICATION

This application is related to co-pending U.S. patent application Ser. No. 18/104,787, filed on Feb. 1, 2023, entitled "METHOD OF PRODUCING DISTINCTIVE DIE-CUT PATTERNS IN DUNNAGE PRODUCT."

CROSS-REFERENCE TO RELATED APPLICATION

The present application claims the benefit of U.S. Provisional Patent Application No. 63/251,257 filed Oct. 1, 2021, entitled "Dunnage Production System", the contents of which is hereby incorporated by reference in their entirety.

BACKGROUND OF THE INVENTION

A. Technical Field

The present invention generally relates to the field of packaging systems. More specifically, the present invention relates to a dunnage production system by converting a sheet stock or roll stock material into a dunnage product used as a protective packaging material.

B. Description of Related Art

Generally, transporting or shipping a wide variety of products is often packed within a container. In many instances, the product does not fit within the container and is crucial to safely transport or store them without causing any damage. Such containers have void space within them which is typically filled with a protective packing material acting as a protective bed to the products. Many types of protective packaging with fillers have been used. These include, for example, paper, dunnage, bubble wrappers, fillers, foam products, and pillows.

Typical protective packaging or dunnage is produced by running a continuous strip of paper into a machine. The paper is crumpled to form a long strip of dunnage with many folds. These crumpled papers are filled inside the void spaces of the container. It may effectively prevent damage to the product during transport and/or storage. However, it is not a permanent solution for transporting or shipping products to a long distance or the product is heavy.

Few existing patent references attempted to address problems cited in the background as prior art over the presently disclosed subject matter are explained as follows:

A prior art U.S. Pat. No. 5,468,556 assigned to Gunter G. Fuss, et. al., entitled "Shaped loose-fill packaging particle and method for making the same," discloses a shaped particle for using as loose fill material to cushion an article within a container includes a strip of stiff yet flexible material having several convoluted regions for absorbing impact energy. The convoluted regions are adapted to compress together to absorb mechanical energy in response to a mechanical force such as would be encountered during an impact and act as resilient springs or bumpers to protect the article. The shaped particle has characteristics that prevent nesting and facilitates interlocking to prevent migration. The invention also provides a method for making embodiments of shaped particles according to the invention.

Another prior art US20210009797 assigned to Norman G. Schabel, et. al., entitled "Lightweight particle filler material" discloses a lightweight material used as fillers for various applications, such as bags or containers fillers; void fillers, and related systems. The lightweight particle composition includes a plurality of lightweight particles that are enclosed or loose. The plurality of lightweight particles includes one of an inorganic or organic composition including a bulk density within a range from about 0.001 g/cc to about 1.5 g/cc, and a particle size within a range from about 0.01 microns to about 90 millimeters (mm). An interstitial void space between the plurality of lightweight particles includes a total of less than about 70% of a volume of the plurality of lightweight particles.

However, the existing systems for producing dunnage utilize an inline die-cutter for manufacturing dunnage pieces. Further, these systems involve an extended process of wetting and gluing of flat material and trimming for creating individual strips. In addition, the system utilizes a holding force to set up the hot melts at the ends of the dunnage.

Therefore, there is a need for an improved system to maximize the conversion of the flat sheets or roll stock into three-dimensional dunnage pieces. Also, there is a need for a system that simplifies the process involved in manufacturing at the same time without affecting the quality of the material. Also, there is a need for a system to produce high-volume dunnage products for supporting, transporting, and shipping of articles or products effectively.

SUMMARY OF THE INVENTION

The present invention generally discloses a dunnage production system by converting a sheet stock or roll stock material into a dunnage product used as a protective packaging material. Also, the present invention discloses an improved system to maximize the conversion of the flat sheets or roll stock into three-dimensional dunnage pieces for supporting, transporting, and shipping articles or products effectively.

According to the present invention, the system is an innovative and intelligent dunnage manufacturing machine that has been designed to produce a void-fill dunnage product from a sheet stock or roll stock material for packing an object in the container. The system is an improved solution that utilizes a conversion machine to convert sheet stock material into the dunnage product or loose fill packing material.

In one embodiment, the system comprises a material feed section at an in-feed section of the system. In one embodiment, the material feed section is configured to feed a sheet stock material into the system to convert it into a dunnage product. The material feed section is loaded with a base material. In one embodiment, the base material is a recycled paper-based material such as chipboard or paperboard. In one embodiment, the base material is fed from a roll format into the system. In another embodiment, the base material may also be fed from a sheet format into the system. In one embodiment, the base material in roll format may receive the unwound roll stock in flat form.

In one embodiment, the base material loaded into the feed section is fed to a downstream forming section. The base material is loaded into an unwind section of the system by an operator. In one embodiment, the unwind section has at least two subsequent sections includes a first section or a die-cutting section and a second section or a tension control section. The system utilizes the unwind capability to reduce the tension on the unwound roll of the sheet stock material to near zero to eliminate the separation of the die-cut material as it is driven through one or more subsequent sections. In one embodiment, the base material is die-cut on the system. In one embodiment, the material may be pre-die cut material, which eliminates the need to do die cutting on the system.

In one embodiment, the die-cutting section may receive undie-cut material in sheet or roll format to perform die-cutting operation, thereby allowing the system to utilize the blank undie-cut material. In one embodiment, the system further comprises a forming section, a gluing section, and a separation section. In one embodiment, the system further utilizes multiple motors configured to feed the sheet or roll stock material from the hopper or roll stand into the downstream forming section, a forming section, a gluing section, and a separation section respectively. In one embodiment, the system further comprises a drive belt or chain. The drive belt comprises a plurality of drive lugs fixed to the drive belt to engage the die-cut openings in the fed base material to positively drive the base material and eliminate the need to use friction or destructive spikes.

In one embodiment, the system further comprises one or more forming mandrels. The forming mandrels are utilized to capture the engaged driven material between the upper lug driven belt and lower forming mandrels. In another embodiment, the forming mandrels are utilized to capture the engaged driven material between the lower lug driven belt and upper forming mandrels. In one embodiment, the system further comprises a downstream forming section having a series of folding and forming members. The series of folding and forming members gradually and reliably fold and form the flat feed material into a predetermined shape in a continuous and uncut format. In one embodiment, the system further comprises one or more sensing devices. In one embodiment, the sensing devices are configured to sense the feed of material. If the feed of the material stops, the dispensing nozzle or glue head will stop applying adhesive material to the fed material.

In one embodiment, the system further comprises a glue feed section or adhesive application section. In one embodiment, the glue feed section comprises a base hopper or tank, a hose component, and a dispensing nozzle. In one embodiment, the base hopper is configured to load a pre-melted adhesive material. In one embodiment, the hose component is configured to allow the transfer of post-melted adhesive material. In one embodiment, the dispensing nozzle is configured to pump or dispense a set rate and quantity of adhesive material to the opposite ends of the base material being fed through the system.

According to the present invention, upon presetting and selecting the values such as the size of the dunnage pieces to be discharged, the system initiates the production process. At first, the roll stock or sheet stock is fed into the in-feed of the material feed section former section by the drive belt. As the roll stock moves through the forming section, it is gradually folded and formed into a three-dimensional shape. Once the formed shape is complete and prior to the compression section a bead of adhesive is applied to the inside of the two opposing ends of the base material via the dispensing nozzle. The dispensing nozzle dispenses a preset amount of adhesive onto the two opposing surfaces being glued together. The formed paper dunnage is now compressed together forming a closed loop dunnage tube. The compression section applies a force to the formed and folded material after the adhesive has been applied so as to allow the adhesive to setup prior to releasing the dunnage to the exit of the system. In one embodiment, the compression is maintained as the flow of formed material moves towards the separation section of the system allowing the glue to setup and cool. The glued flow of material arrives at the separation section where a separating roller pulls the perforations apart at a specified number or length of dunnage materials. The separated dunnage pieces at a set number or length are discharged into a hopper for collection.

During the operation, various levels are monitored including, but not limited to, roll stock size, sheet stock count, adhesive tank level, discharge hopper level, and any stoppages sensed using standard sensing devices. In one embodiment, the sensing devices are utilized to monitor and control the tension on the fed material so that the die-cut pieces may be separated when required. In one embodiment, the system incorporates all the required interfaces to allow the driven belt to engage the fed material without damage to the material being fed into the system.

In one embodiment, the system further utilizes one or more web feed devices to control the flow and control of the die-cut materials as they flow through the various sections of the system. In one embodiment, the system may control the feed rate of the roll stock or sheet stock material throughout the system. In one embodiment, the system may monitor the roll stock material level at the unwind and alerts the operator when the roll is nearing the end of its level to improve the operating time. In one embodiment, the system may monitor the sheet stock material hopper level at the sheet feeder and alerts the operator when the quantity is nearing a low level, thereby allowing the operator to reload the sheet stock to avoid the stoppage of the system.

In one embodiment, the system further utilizes a controller configured to monitor and control all the functions of the entire system. In one embodiment, the controller is programmable logic controller (PLC). In one embodiment the system further utilizes a very unique and specific die-cut pattern to maximize the conversion of the flat fed sheets or roll stock into dunnage pieces. In one embodiment the system further utilizes a very unique folded and formed shape to maximize the conversion from flat stock to a three-dimensional form creating a high volume dunnage product. In one embodiment the system may operate in a horizontal or vertical format non-gravity dependent reducing its footprint. In one embodiment the system may also sense a discharge hopper level and start and stop the creation of the dunnage product based upon a hopper fill level.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
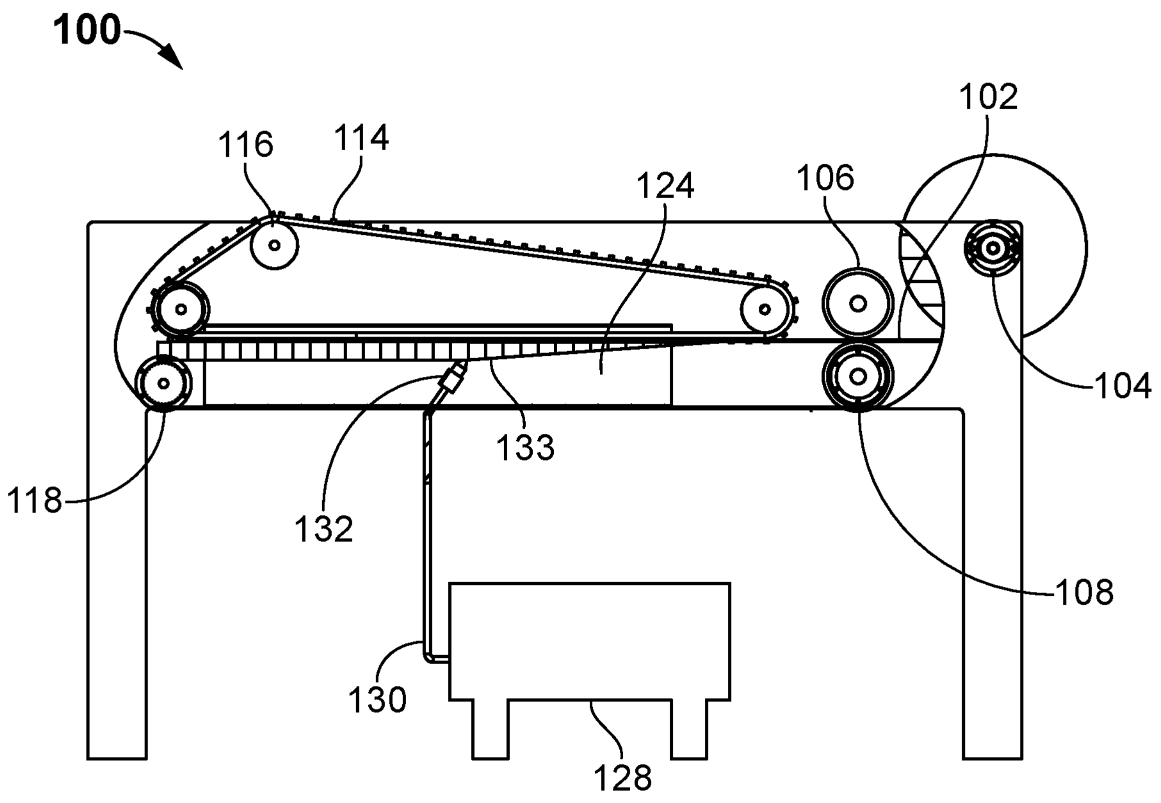
FIG. 1 shows a side view of a dunnage production system in an embodiment of the present invention.
Figure 2:
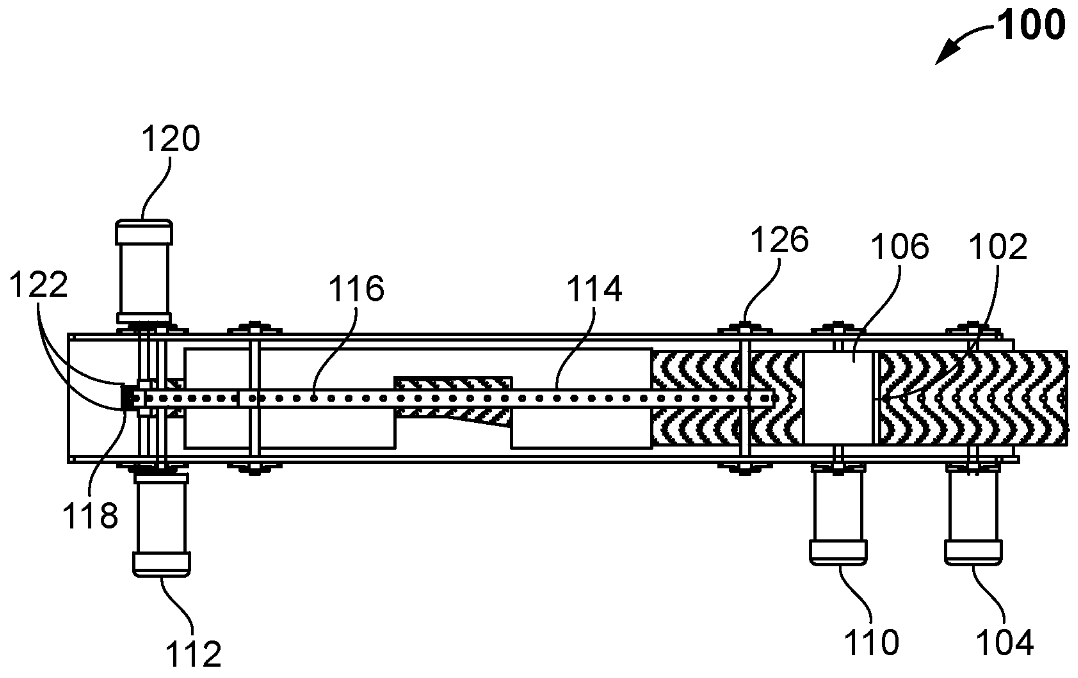
FIG. 2 shows a top view of the dunnage production system in one embodiment of the present invention.

Referring to FIGS. 1-2, a side view and a top view of a dunnage production system (hereinafter referred as system) 100 in a typical use case respectively, according to one embodiment of the present invention. The system 100 is an innovative and intelligent dunnage manufacturing machine that has been designed to produce a void-fill dunnage product from a sheet stock or roll stock material for packing an object in the container. The system 100 is an improved solution that utilizes a conversion machine to convert sheet stock or roll stock material into the dunnage product or loose fill packing material.

In one embodiment, the system 100 comprises a material feed section 102 at an in-feed section of the system 100. In one embodiment, the material feed section 102 rotatably mounted over a first shaft 104. In one embodiment, the material feed section 102 is configured to feed a sheet stock or roll stock material into the system 100 to convert it into a dunnage product. The material feed section 102 is loaded with a base material 136 (shown in FIG. 5). In one embodiment, the base material 136 is a recycled paper-based material such as chipboard or paperboard. In one embodiment, the base material 136 is fed from a roll format into the system 100. In another embodiment, the base material 136 may also be fed from a sheet format into the system 100. In one embodiment, the base material 136 in roll format may receive the unwound roll stock in flat form.

In one embodiment, the base material 136 loaded into the feed section 102 is fed to a downstream forming section 124. The base material 136 is loaded into an unwind section of the system 100 by an operator. In one embodiment, the unwind section has at least two subsequent sections includes a first section or a die-cutting section 106 and a second section or a tension control section 108. In one embodiment, the die-cutting section 106 is rotatably mounted over a second shaft 110. The system 100 utilizes the unwind capability to reduce the tension on the unwound roll of the sheet stock material to near zero to eliminate the separation of the die-cut material as it is driven through one or more subsequent sections (124 and 133). In one embodiment, the sheet stock material is fed from a hopper without separation of the die-cut material as it is driven through the subsequent sections (124 and 133). In one embodiment, the base material 136 is die-cut on the system 100. In one embodiment, the material may be pre-die cut material, which eliminates the need to do die cutting on the system.

In one embodiment, the die-cutting section 106 may receive undie-cut material in sheet or roll format to perform die-cutting operation, thereby allowing the system 100 to utilize the blank undie-cut material. In one embodiment, the system 100 further comprises a downstream forming section 124, a gluing section 133, and a separation section 118. In one embodiment, the system 100 further utilizes multiple motors configured to feed the sheet or roll stock material from the hopper or roll stand into the downstream forming section 124, a gluing section 133, and a separation section 118 respectively. In one embodiment, the system 100 further comprises a drive belt or chain 114. The drive belt 114 comprises a plurality of drive lugs 116 fixed to the drive belt 114 to engage the die-cut openings 138 in the fed base material 136 to positively drive the base material 136 and eliminate the need to use friction or destructive spikes.

In one embodiment, the system 100 further comprises one or more forming mandrels 122. The forming mandrels 122 are utilized to capture the engaged driven material between the upper lug driven belt 114 and lower forming mandrels. In another embodiment, the forming mandrels 122 are utilized to capture the engaged driven material between a lower lug driven belt and upper forming mandrels. In one embodiment, the system 100 further comprises a downstream forming section 124 having a series of folding and forming members. The series of folding and forming members gradually and reliably fold and form the flat fed material into a predetermined shape in a continuous and uncut format. In one embodiment, the system 100 further comprises a third shaft 112 and a fourth shaft 120 at its distal end. In one embodiment, the system 100 further comprises one or more sensing devices 126. In one embodiment, the sensing devices 126 are configured to sense the feed of material. If the feed of the material stops, the dispensing nozzle or glue head 132 will stop applying adhesive material to the fed material.

In one embodiment, the system 100 further comprises a glue feed section or adhesive application section. In one embodiment, the glue feed section comprises a base hopper or tank 128, a hose component 130, and a dispensing nozzle 132. In one embodiment, the base hopper 128 is configured to load a pre-melted adhesive material. In one embodiment, the hose component 130 is configured to allow the transfer of post-melted adhesive material. In one embodiment, the dispensing nozzle 132 is configured to pump or dispense a set rate and quantity of adhesive material to the opposite ends of the base material 136 being fed through the system 100.

Figure 3:
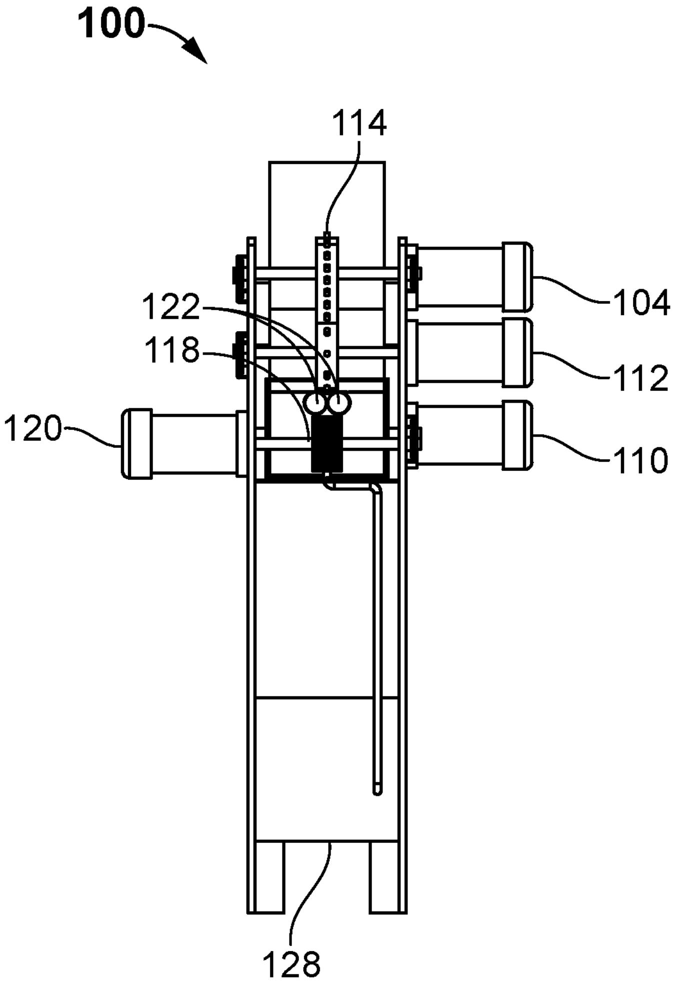
FIG. 3 shows an end view of the dunnage production system at the discharge end in one embodiment of the present invention.

Referring to FIG. 3, a rear view of the dunnage production system 100, according to one embodiment of the present invention. In one embodiment, the sheet or roll stock material is fed from the hopper or roll stand into the downstream forming section 124, a gluing section 133, and a separation section 118 respectively, thereby producing the dunnage product. In one embodiment, the system 100 further comprises a drive belt 114 configured to drive the sheet or roll stock material and eliminate the need to use friction or destructive spikes. In one embodiment, the system 100 further comprises one or more shafts include a first shaft 104, a second shaft 110, a third shaft 112, and a fourth shaft 120.

In one embodiment, the system 100 further comprises a settable separation section 118 at its exit. The settable separation system 118 is configured to separate the die-cut dunnage pieces from the stream of dunnage material in a preset length and quantity. In one embodiment, the system 100 further comprises one or more forming mandrels 122. The forming mandrels 122 are utilized to capture the engaged driven material between the upper lug driven belt 114 and lower forming mandrels. In one embodiment, the system 100 further comprises an adhesive application system having a base hopper 128 that stores pre-melted adhesive materials. The adhesive material is then pumped through the hose component 130 and dispensed at the opposite ends of the base material 136 using the dispensing nozzle 132.

Figure 4:
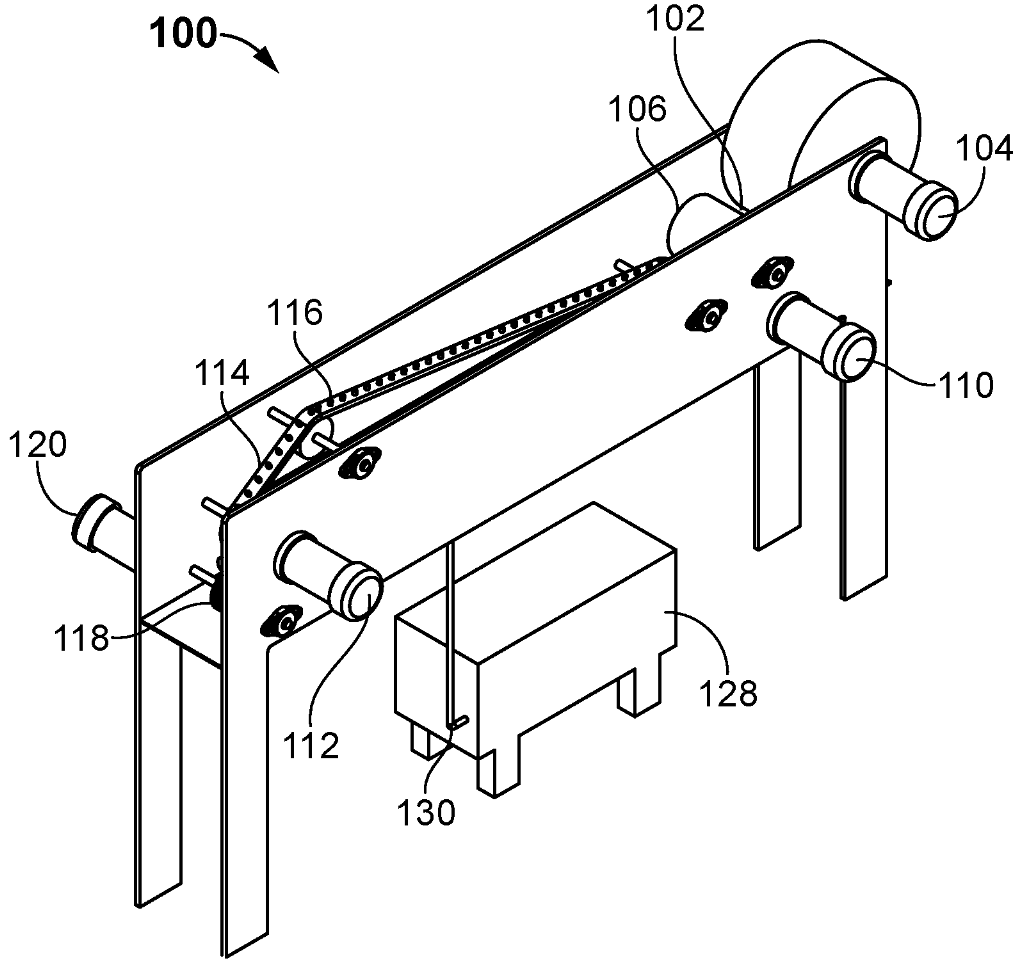
FIG. 4 shows a perspective view of the dunnage production system in one embodiment of the present invention.

Referring to FIG. 4, a perspective view of the dunnage producing system 100, according to one embodiment of the present invention. In one embodiment, the system 100 comprises a material feed section 102 at an in-feed section of the system 100. In one embodiment, the material feed section 102 is configured to feed a sheet stock material into the system 100 to convert it into the dunnage product. The material feed section 102 is loaded with a base material 136 or sheet stock material. In one embodiment, the base material 136 is a recycled paper-based material such as chipboard or paperboard.

In one embodiment, the base material 136 is fed from a roll stock format into the system 100. In another embodiment, the base material 136 is fed from a sheet stock format into the system 100. In one embodiment, the roll stock is loaded into an unwind section of the system 100 by the operator. The roll stock is unwound and threaded to the drive belt 114 via the tension control section 108. In one embodiment, the flat roll stock is engaged with the drive belt 114 such that the lugs 116 are aligned with the holes in the die-cut material. In one embodiment, the system 100 further comprises a glue feed section or adhesive application section. In one embodiment, the glue feed section comprises a base hopper or tank 128, a hose component 130, and a dispensing nozzle 132. The base hopper 128 is loaded with the adhesive material and the system 100 has converted the solid adhesive materials to a liquid form. In one embodiment, the base hopper 128 is loaded with the pre-melted adhesive material.

According to the present invention, upon presetting and selecting the values such as, the size of the dunnage pieces to be discharged, the system 100 initiate the production process. At first, the roll stock or sheet stock is fed into the in-feed of the material feed section 102 and subsequently to the forming section 124 by the drive belt 114. As the roll stock moves through the forming section 124, it is gradually folded and formed into the three-dimensional shape. Once the formed shape is complete and prior to the compression section a bead of adhesive is applied to the inside of the two opposing ends of the base material 136 via the dispensing nozzle 132. The dispensing nozzle 132 dispenses a preset amount of adhesive onto the two opposing surfaces being glued together. The formed paper dunnage is now compressed together forming a closed loop dunnage tube. The compression section applies a force to the formed and folded material after the adhesive has been applied so as to allow the adhesive to setup prior to releasing the dunnage to the exit of the system 100. In one embodiment, the compression is maintained as the flow of formed material moves towards the separation section 118 of the system 100 allowing the glue to setup and cool. The glued flow of material arrives at the separation section 118 where a separating roller pulls the perforations apart at a specified number or length of dunnage materials. The separated dunnage pieces at a set number or length are discharged into a hopper for collection.

During the operation, various levels are monitored including, but not limited to, roll stock size, sheet stock count, adhesive tank level, discharge hopper level, and any stoppages sensed using standard sensing devices 126. In one embodiment, the sensing devices 126 are utilized to monitor and control the tension on the fed material so that the die-cut pieces may be separated when required. In one embodiment, the system 100 incorporates all the required interfaces to allow the driven belt 114 to engage the fed material without damage to the material being fed into the system 100.

In one embodiment, the system 100 further utilizes one or more web feed devices to control the flow and control of the die-cut materials as they flow through the various sections of the system 100. In one embodiment, the system 100 may control the feed rate of the roll stock or sheet stock material throughout the system 100. In one embodiment, the system 100 may monitor the roll stock material level at the unwind and alerts the operator when the roll is nearing the end of its level to improve the operating time. In one embodiment, the system 100 may monitor the sheet stock material hopper level at the sheet feeder and alerts the operator when the quantity is nearing a low level, thereby allowing the operator to reload the sheet stock to avoid the stoppage of the system 100.

In one embodiment, the system 100 further utilizes a controller configured to monitor and control all the functions of the entire system 100. In one embodiment, the controller is programmable logic controller (PLC). In one embodiment the system 100 further utilizes a very unique and specific die-cut pattern to maximize the conversion of the flat fed sheets or roll stock into dunnage pieces. In one embodiment the system 100 further utilizes a very unique folded and formed shape to maximize the conversion from flat stock to a three-dimensional form creating a high volume dunnage product. In one embodiment the system 100 may operate in a horizontal or vertical format non-gravity dependent reducing its footprint. In one embodiment the system 100 may also sense a discharge hopper level and start and stop the creation of the dunnage product based upon a hopper fill level.

Figure 5:
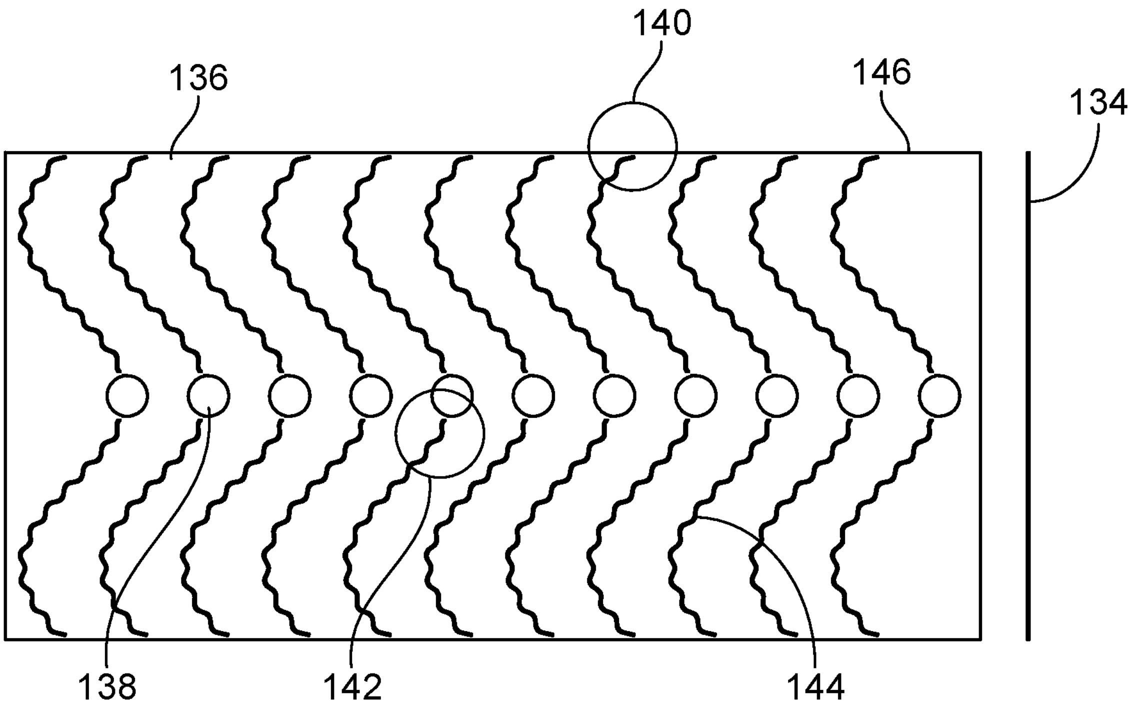
FIG. 5 shows a typical die-cut pattern of a material feed through the dunnage production system to produce a dunnage lose fill product in one embodiment of the present invention.

Referring to FIG. 5, a typical die-cut pattern of the base material 136 resulting a dunnage loose fill product while fed through the system 100, according to one embodiment of the present invention. In one embodiment, the base material 136 has a pre-defined width 134 and length 146. The base material 136 has been previously die-cut in a manner as to allow the dunnage to remain in a partially connected manner since the die-cut pattern 144 is not fully cut through the base material 136 in multiple locations (140 and 142). In one embodiment, the base material 136 in a sheet form will receive the sheet stock in flat form, the material has previously been die-cut in a manner as to allow the dunnage to remain in a partially connected manner since the die-cut pattern was not fully cut through the material in multiple locations (140 and 142).

Advantageously, the dunnage production system of the present invention converts the sheet stock material into a dunnage product that has been used as a protective packaging material. The system utilizes a very unique and specific die-cut pattern to maximize the conversion of the flat sheets or roll stock into three-dimensional dunnage pieces. The dunnage product is used for supporting, transporting, and shipping of articles or products effectively. Further, the system simplifies the process involved in manufacturing at the same time without affecting the quality of the material.

Further, the dunnage production system of the present invention is designed to be effective in the application. The effective system for preparing loose fill packing material in formed dunnage particles from a sheet stock or roll stock material provides good marketability for the manufacturer. The user benefits from the improved dunnage production system, which may provide considerable market interest to the product.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A dunnage producing system comprising:

a material feed section configured to feed stock material into the system, the stock material having a row of openings extending in a longitudinal direction of the stock material;

a drive belt or chain having a single row of a plurality of lugs, each of the plurality of lugs having a cylindrical, non-pointed shape engaging one of the openings in the stock material to positively drive the stock material, wherein the single row of the plurality of lugs consists of a single row of a plurality of lugs;

a glue feed section having a dispensing nozzle configured to dispense adhesive material to the stock material;

a controller configured to control the system; and a forming section having forming members configured to form the stock material into a predetermined shape retained by the adhesive material.

2. The system of claim 1, further comprising multiple sensing devices operativity connected to the controller, the multiple sensing devices adapted to monitor tension in the stock material.

3. The system of claim 1, further comprising an unwind section comprising a tension control section configured to receive the stock material.

4. The system of claim 1, further comprising a compression section configured to apply compression to the predetermined-shaped stock material.

5. The system of claim 1, further comprising a separation section configured to receive the predetermined-shaped stock material and separate the predetermined-shaped stock material at a predetermined length.

6. The system of claim 5, wherein the separation section comprises a separating roller.

7. The system of claim 1, wherein the controller controls the feed rate of the stock material throughout the system.

8. The system of claim 1, wherein the predetermined shape comprises a tube.

9. The system of claim 1, wherein the stock material having the row of openings extending in the longitudinal direction of the stock material further comprises a plurality of longitudinally-spaced, transversely-extending perforations and uncut portions between the longitudinally-spaced, transversely-extending perforations and opposing longitudinal edges of the sheet material.

10. The system of claim 9, wherein the plurality of longitudinally-spaced, transversely-extending perforations each comprise sinusoidal perforations.

11. The system of claim 10, further comprising a separation section configured to receive the stock material in the predetermined shape and separate the stock material in the predetermined shape at the sinusoidal perforations to produce dunnage having sinusoidal edges.

12. The system of claim 1, wherein the stock material comprises one of sheet stock material and roll stock material.

13. The system of claim 1, wherein the forming members comprises one or more folding mandrels.

14. The system of claim 1, further comprising, prior to the material feed section, a die-cut section configured to receive undie-cut stock material and die-cut the row of openings in the undie-cut stock material.

15. The system of claim 1, wherein each of the plurality of lugs engage the one of the openings in the stock material without damaging the stock material.

16. The system of claim 1, wherein the stock material comprises one of chipboard and paperboard.

17. The system of claim 1, wherein is each of plurality of lugs having the cylindrical, non-pointed shape is sized to be received by one of the openings in the stock material without damaging the stock material.

18. A dunnage producing system comprising:

a material feed section configured to feed stock material into the system, the stock material having a row of openings extending in a longitudinal direction of the stock material, a plurality of longitudinally-spaced, transversely-extending perforations, and uncut portions between the longitudinally-spaced, transversely-extending perforations and opposing longitudinal edges of the sheet material;

a drive belt or chain having a single row of a plurality of lugs, each of the plurality of lugs having a cylindrical, non-pointed shape engaging one of the openings in the stock material to positively drive the stock material;

a glue feed section having a dispensing nozzle configured to dispense adhesive material to the stock material;

a forming section having forming members configured to form the stock material into a predetermined shape retained by the adhesive material; and a separation section configured to receive the predetermined-shaped stock material and separate the predetermined-shaped stock material at the uncut portions at a predetermined length.

19. The system of claim 18, wherein the stock material comprises one of chipboard and paperboard.

* * * * *